United States Patent

[11] 3,628,179

| [72] | Inventor | David W. Cuff |
| | | Chepachet, R.I. |
| [21] | Appl. No. | 806,511 |
| [22] | Filed | Mar. 12, 1969 |
| [45] | Patented | Dec. 14, 1971 |
| [73] | Assignee | American Optical Corporation |
| | | Southbridge, Mass. |

[54] STACKED COMPOSITE PLATE LASER
8 Claims, 3 Drawing Figs.

[52] U.S. Cl. ............................................. 331/94.5, 330/4.3
[51] Int. Cl. ............................................. H01s 3/04, H01s 3/05
[50] Field of Search ............................................. 331/94.5; 330/4.3

[56] References Cited
UNITED STATES PATENTS

| 3,512,104 | 5/1970 | Miller ........................... | 331/94.5 |
| 3,487,330 | 12/1969 | Gudmundsen ............... | 331/94.5 |
| 3,500,231 | 3/1970 | Tomiyasu et al.............. | 331/94.5 |

Primary Examiner—Ronald L. Wibert
Assistant Examiner—F. L. Evans
Attorneys—William C. Nealon, Noble S. Williams and Robert J. Bird ABSTRACT: This specification discloses a laser system comprising a plurality of spaced, parallel plates carrying discs of laser glass aligned to form a continuous cavity through a plurality of parallel rows. Means are provided to circulate coolant between the plates to cool the discs of laser glass.

Patented Dec. 14, 1971
3,628,179
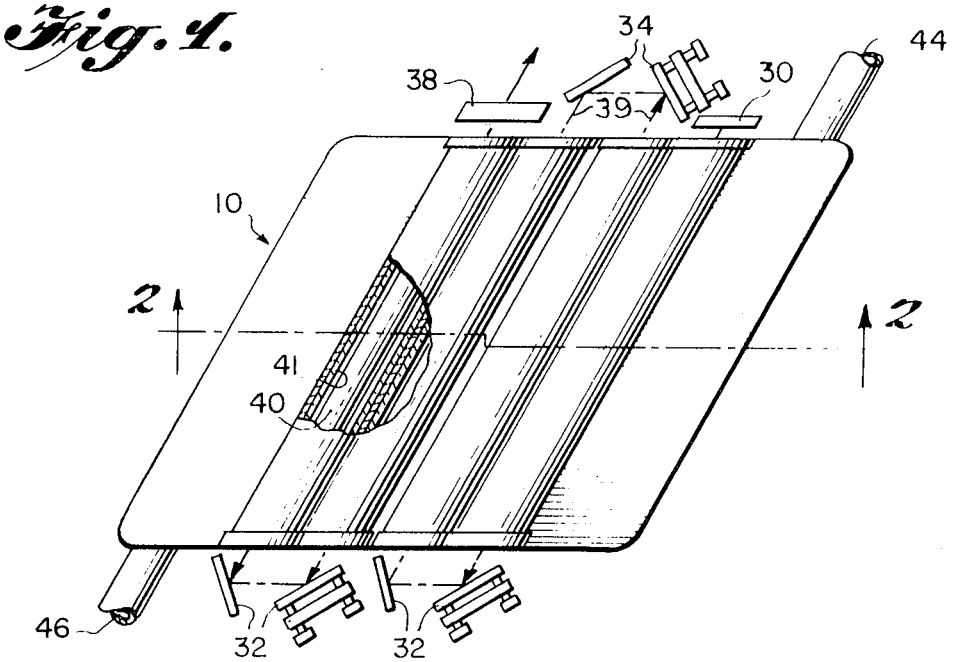
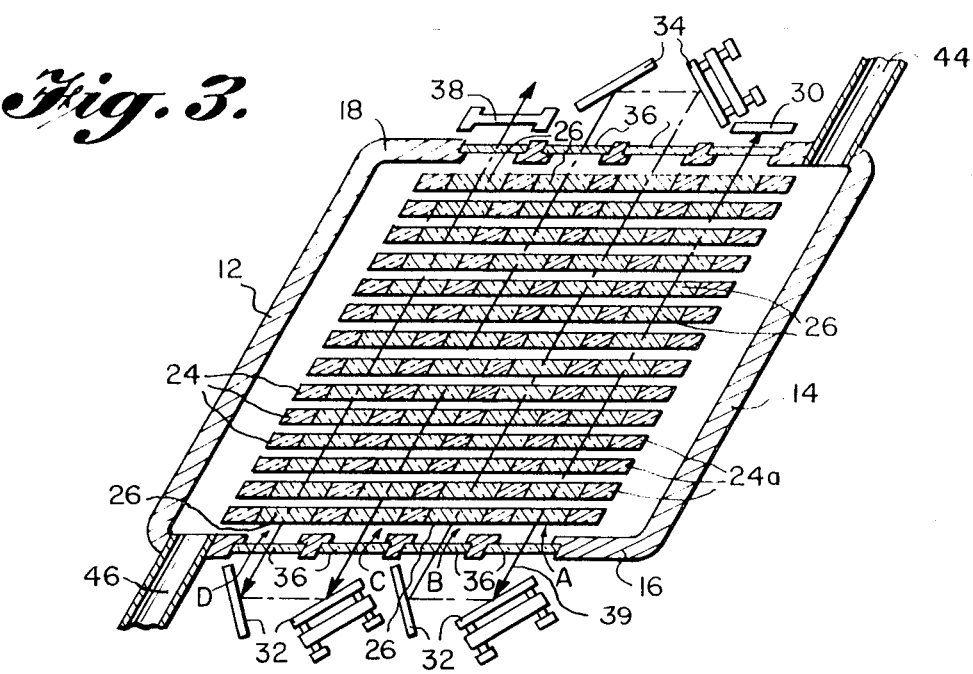
INVENTOR
DAVID W. CUFF
BY
Noble Williams
ATTORNEY

STACKED COMPOSITE PLATE LASER

BACKGROUND OF THE INVENTION

This invention relates to a laser system, and, more particularly, to a laser system formed by a plurality of spaced, parallel plates carrying discs of laser glass.

Glass laser material is normally excited to a state in which the material will amplify light by being irradiated with high-intensity light produced by inert-gas flash lamps. This means of exciting the laser glass is called pumping and the light which excites the laser glass is called pump light. The pumping of the laser glass not only excites the glass to a state in which it amplifies light but also introduces heat into the laser glass. Because the laser glass has low thermal conductance, the cooling of the laser glass is a substantial problem. Due to the fact that very little can be done to improve the thermal conductivity of laser glass, configurational solutions have been proposed.

In one approach to the problem, a conventional laser rod is sectioned transversely to form a series of discs which are disposed normal to the laser axis and a coolant is caused to flow between the discs. A laser of this form is called a glass disc laser. The present invention is an improvement in this type of laser.

SUMMARY OF THE INVENTION

The laser system of the present invention comprises a plurality of composite plates, each containing discs of laser glass. The plates extend in a spaced parallel relation with the laser glass discs aligned in a plurality of rows. Means are provided to circulate coolant between the plates. The plates serve both to provide a convenient supporting arrangement for the laser glass discs and also to promote laminar flow between the discs. As a result, a higher rate of coolant flow without turbulence can be obtained and thus more effective cooling is achieved without introducing optical distortion from flow conditions. By means of mirrors, the laser cavity is arranged to extend along a path passing through each row of discs in series. This arrangement provides compensation for any thermal gradient effects which arise from traversal of the coolant.

Accordingly, an object of the present invention is to provide an improved disc laser system.

Another object of the present invention is to improve the effectiveness of the cooling of the laser discs in a disc laser system.

A further object of the present invention is to promote laminar flow of the coolant between the laser discs in a disc laser system.

A still further object of the present invention is to compensate for any thermal gradient in a disc laser system.

Further objects and advantages of the present invention will become readily apparent as the following detailed description of the invention unfolds and when taken in conjunction with the drawings.

BRIEF DESCRIPTION OF THE DRAWINGS

FIG. 1 is a plan view of the laser system of the present invention;

FIG. 2 is a sectional view taken along the lines 2—2 of FIG. 1; and,

FIG. 3 is a sectional view taken along the lines 3—3 of FIG. 2.

BRIEF DESCRIPTION OF THE PREFERRED EMBODIMENTS

As shown in the drawings, a laser housing 10 is formed by a pair of metal sidewalls 12 and 14, and metal end walls 16 and 18. A pair of transparent glass plates 20 and 22 form a top and bottom cover for the housing. A plurality of thin glass plates 24 are disposed in the housing 10, each plate 24 being of approximately the same height as the side and end walls and being secured in fixed positions within the housing 10 by suitable means not shown, such as retaining rods or brackets secured to one or both of the plates 20 and 22; but in such a manner as to allow any one or more to be replaced when needed.

The plates 24 comprise glass matrices, in which discs 26 of the laser glass are mounted. The discs, which for example may comprise glass doped with neodymium, are bonded to the supporting matrices by fusing. The matrices comprise a material which is lossy to light at the wavelength of the laser light produced by the system but which effectively transmits the pump light. The matrix material for example may be samarium-doped glass. The discs 26 are arranged in their respective plates so that when the plates are disposed in a parallel, spaced, aligned arrangement as shown in FIG. 3, the discs are aligned in parallel rows with the discs of each row being on a common axis. The four rows of discs shown in FIG. 1 are designated A, B, C and D.

A mirror 30 is positioned externally of the housing 10 on and perpendicular to the common axis of discs of row A so as to reflect light received from the discs of row A back through the discs of row A. Mirrors 34 and 32 are positioned externally of the housing 10 on the common axis of the rows of discs 26 at angles with respect to these axes to reflect light received from each row of discs into the next adjacent row of discs along the path represented by the dashed line 39. The mirror 38 is positioned on and perpendicular to the axis of discs of the row D to reflect light received from row D back through row D. Some of the mirrors 34 and 32 are adjustable to permit precise alignment thereof. The end walls 16 and 18 are provided with transparent windows 36 to permit the passage of the light energy between the mirrors and the rows of discs. The optical path between the mirrors 30 and 38 is referred to as a laser cavity, which is defined by the mirrors 30 and 38.

A plurality of elongated flash lamps 40 are disposed externally of the housing 10 along the glass cover plates 20 and 22 parallel to the rows of discs to irradiate the discs and thus pump the discs to an excited state, in which they will amplify light. The flash lamps are positioned centrally in glass envelopes 41, which define water jackets around the flash tubes for cooling the flash tubes. Reflectors 42 are positioned over the flash lamps 40 to reflect more of the pump light to the discs.

In operation, coolant in the form of a fluid is introduced into the housing 10 through an inlet 44, from which it flows through the housing in the channels between the parallel plates 24, and then out through an outlet 46. The leading edges 24a of the plates 24 are designed to be of a sufficient length to repress initial turbulence generated by the coolant entering the spaces, and thereby promote laminar flow across the laser discs 26.

When the laser material of the discs 26 has been excited by the pump light from the flash lamps 40, the laser material will emit light of a particular wavelength which in the case of neodymium-doped glass will be 1.06 microns. When light of this wavelength travels through the excited laser material it will stimulate further emissions of the same wavelength, which emissions will be in phase with the stimulating light. In this manner, light of the laser wavelength is amplified as it travels through the laser material. Light which is not parallel to the common axes of the discs will interact with the lossy material of the matrix in which the discs are mounted and be eliminated. Light travelling parallel to the axis of the discs will be reflected back and forth between the mirrors 30 and 38 to set up a standing wave of light energy between the mirrors 30 and 38. These standing waves of laser light energy are called laser oscillations. The mirror 38 is made partially transmissive to transmit some of the light energy from the laser oscillations to a target.

According to one of the main features of the present invention an even number of rows of laser discs are provided so that thermal gradient effects due to the coolant flowing from one side of the housing to the other cancel out. A thermal gradient across the discs will cause a gradient in the index of refraction, which in turn will cause the laser light to bend toward the warmer side of each row of discs. Because a laser ray will travel opposite directions through adjacent rows of discs, the bending of a ray to one side of the optical path of the ray in one row will be offset by a bending toward the opposite side of the optical path in the adjacent row. Thus the use of a plurality of parallel rows of discs arranged in sequence in the laser cavity cancels out the effect of any thermal gradient. Although only four rows of discs are shown in FIG. 1, additional cavities in multiples of two may be added depending on the energy requirements of the system.

The plates 24 and the windows 36 are set at Brewsters angle as shown to prevent reflection losses. Alternatively, a coolant having the same index of refraction as the laser discs 26 could be used and then the plates 24 and windows 36 could be positioned normal to the optic axis of the laser discs 26 without introducing reflection losses. The material of the matrices in which the laser discs 26 are mounted can be thermally matched to the laser material and its index of refraction is preferably approximately one part in a thousand higher at the emission wavelength than that of the laser material. In this manner, the spread of the laser beam produced by the system is minimized.

The composite glass plates 24 including the laser discs 26 can be fabricated by preshaping the constituent parts to fit together, drawing or attenuating them at the appropriate softening temperatures to final size to provide a rectangular block which is subsequently sliced into the thin plates 24.

They are then ground and polished to the desired optical tolerances.

The above-described structure with laminar flow between the plates, in addition to being self-compensating for thermal gradient effects as discussed above, permits more effective cooling without optical wave degradation. The inlet and outlet manifolding for the coolant is simple in construction and design as a result of flow being required in only one direction through the housing.

The above-described system is of a preferred embodiment of the invention and many modifications may be made thereto without departing from the spirit and scope of the invention, which is defined in the appended claims.

I claim:

1. A laser system comprising a plurality of plates of passive material each plate containing at least one section of laser material contained within the boundaries of such plate, said plates being arranged in a spaced parallel relation so that said sections of laser material are aligned in a row, means for supplying pumping light energy to said sections of laser material, and means for circulating coolant between said plates in a direction parallel to the longitudinal dimension of said plates.

2. A laser system as recited in claim 1 wherein the material of said sections is laser glass.

3. A laser system as recited in claim 1 wherein each of said plates contains a plurality of sections of laser material, wherein said plates are arranged to align said sections of laser material into a plurality of rows, and wherein means is provided to interconnect said rows serially to define a single optical path through all of said rows.

4. A laser system as recited in claim 3 further comprising means defining a laser cavity extending through said serially interconnected rows.

5. A laser system as recited in claim 1 further comprising a housing containing said plates, said housing defining with said plates parallel channels between said plates through which said coolant is circulated.

6. A laser system as recited in claim 5 wherein said housing defines first and second manifolds connecting with the opposite ends of said parallel channels.

7. A laser system as recited in claim 1 wherein said section of laser material in each of said plates comprises a disc of laser glass.

8. A laser system as recited in claim 7 wherein the portion of each of said plates surrounding the disc of laser glass in such plate comprises a material which is absorbent at the emission wavelength of said laser glass and substantially transparent at the pumping wavelengths of said laser glass.

* * * * *